United States Patent [19]
Myers

[11] Patent Number: 4,785,431
[45] Date of Patent: Nov. 15, 1988

[54] BROAD-BAND HYDRAULIC VIBRATOR
[75] Inventor: Wilbur J. Myers, Davis, Okla.
[73] Assignee: Conoco Inc., Ponca City, Okla.
[21] Appl. No.: 66,390
[22] Filed: Jun. 25, 1987
[51] Int. Cl.$^4$ .............................................. H04R 23/00
[52] U.S. Cl. .................................... 367/189; 367/190; 181/121; 92/13.51
[58] Field of Search ................ 367/189, 190; 181/106, 181/108, 113, 114, 119, 121; 92/13.1, 13.51, 13.8

[56] References Cited
U.S. PATENT DOCUMENTS

| | | | |
|---|---|---|---|
| 108,426 | 10/1870 | Young | 92/13.51 |
| 1,325,006 | 12/1919 | Dearsley | 92/13.51 |
| 3,815,480 | 6/1974 | Spyra | 92/13.51 |
| 4,106,586 | 8/1978 | Stafford | 181/121 |
| 4,388,981 | 6/1983 | Fair | 181/119 |
| 4,450,298 | 5/1984 | Weber et al. | 181/121 |
| 4,641,725 | 2/1987 | Cole et al. | 181/119 |

Primary Examiner—Charles T. Jordan
Assistant Examiner—John W. Eldred
Attorney, Agent, or Firm—Ronald J. Carlson; Cortlan R. Schupbach; Frank J. Kowalski

[57] ABSTRACT

A hydraulic vibrator having an adjustable piston rod and a fixed piston rod to vary the cylinder volume for operation at different vibration frequencies. The adjustable piston rod is in threaded engagement with the fixed piston rod and has a piston head adjacent a piston head on the fixed piston rod. Rotation of the adjustable piston rod displaces the two piston heads, thereby varying the cylinder volume of the hydraulic vibrator.

10 Claims, 2 Drawing Sheets

BROAD-BAND HYDRAULIC VIBRATOR

BACKGROUND OF THE INVENTION

The invention relates to a broad-band hydraulic vibrator for use as a seismic source and having an adjustable piston for reducing cylinder volume at high frequencies.

Hydraulic vibrators used as a seismic source generate a spectrum of frequencies ranging from a low frequency to a high frequency, to produce a frequency sweep over the desired range of operation. During low frequency operation, the piston stroke of the vibrator is relatively long and encompasses a large cylinder volume. In contrast, at higher frequency operation, the piston stroke of the vibrator is shortened and encompasses a smaller cylinder volume.

The large volume of hydraulic fluid within the cylinder which is necessary for low frequency operation has a compressibility factor which impairs efficient vibrator operation during high frequency operation. Therefore, mechanisms have been developed to provide variable cylinder volumes in the hydraulic vibrator to optimize the operation of the vibrator at different frequencies of operation. The adjustment mechanisms utilize movable end sleeves or cylinder heads which are positioned at opposite ends of the cylinder. The mechanisms are positioned in an extended position during low frequency, long-stroke operation and are moved inward to reduce cylinder volume during high frequency, short-stroke operation.

The adjustment mechanisms can be operated manually by setting the position of the mechanism for a frequency sweep or under an automatic control which positions the adjustment mechanism depending on the vibrator frequency during the frequency sweep. Another control system provides a dual-mode operation with a set frequency to change the adjustment from long-stroke position to short-stroke position when the sweep frequency exceeds the set frequency.

SUMMARY OF THE INVENTION

The present invention relates to an improved hydraulic vibrator for producing vibration energy over a broad band of frequencies and having an adjustable piston structure for changing the cylinder volume. The hydraulic vibrator comprises a housing having a base plate for engaging the earth structure and a reaction mass positioned in the housing. A fixed piston rod is attached to the base plate, extends through a cylinder bore of the reaction mass and is attached at its other end to a top structure of the housing. A piston head is positioned on a middle portion of the fixed piston rod and mates with the cylinder bore. An adjustable piston rod has an axial bore which mates with a shaft section of the fixed piston rod and a piston head on one end which is positioned adjacent the piston head of the fixed piston rod. An adjustment means moves the adjustable piston rod along the shaft section.

The two piston heads on the fixed piston rod and the adjustable piston rod form a first and second cylinder chamber. Hydraulic fluid is alternatively pumped into the two chambers and causes reciprocal movement between the reaction mass and the piston heads to generate vibration energy. The adjustment means changes the axial distance between the piston heads and varies the cylinder chamber volume. Therefore, the cylinder volume can be adjusted for a broad band of frequencies to accommodate long-stroke, high volume operation at low frequencies ranging to short-stroke, low volume operation at high frequencies.

BRIEF DESCRIPTION OF THE DRAWING(S)

FIG. 1 illustrates a hydraulic vibrator embodying the present invention in a partial section view; and FIG. 2 illustrates the cylinder bore mechanism of the hydraulic vibrator in an assembly view.

DETAILED DESCRIPTION OF THE INVENTION

Figure 1:
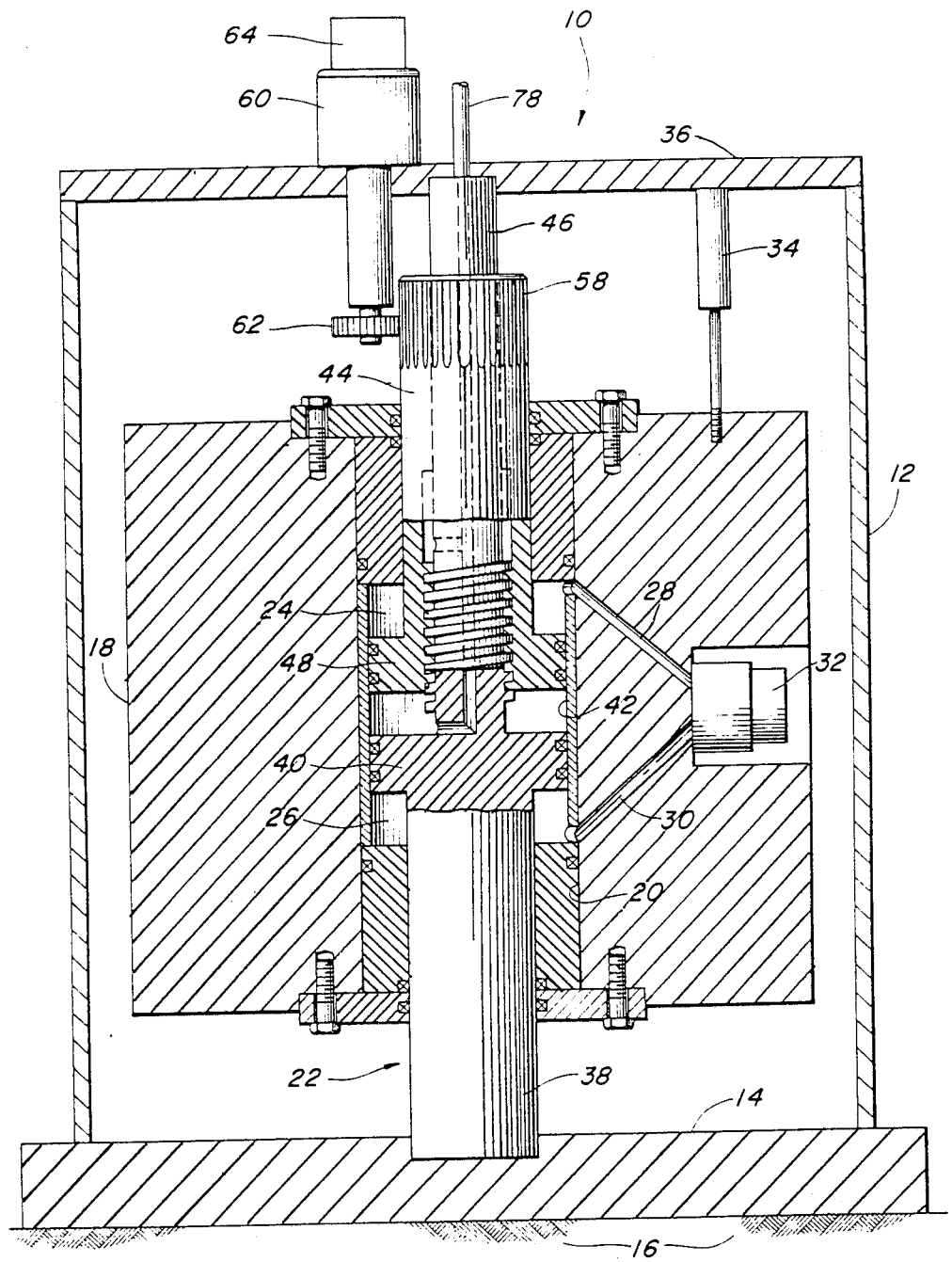

FIG. 1 illustrates a hydraulic vibrator 10 embodying the present invention. The hydraulic vibrator 10 includes a housing 12 having a base plate 14 for contacting an earth structure 16. The hydraulic vibrator 10 operates as a seismic source to generate vibration energy over a varying frequency band and couple the energy through the base plate 14 into the earth structure 16.

A reaction mass 18 is disposed within the housing 10 and has a cylinder bore 20 which, together with a central piston assembly 22, forms a first cylinder chamber 24 and a second cylinder chamber 26. The central piston assembly 22 provides an improved mechanism for providing an adjustable volume in the cylinder chambers 24 and 26 and is described in more detail hereafter.

A first hydraulic passage 28 supplies hydraulic fluid to the first cylinder chamber 24 and a second hydraulic passage 30 supplies hydraulic fluid to the second cylinder chamber 26. The hydraulic passages 28 and 30 are connected to a hydraulic servo valve 32 which controls the flow of hydraulic fluid into the cylinder chambers 24 and 26 to produce relative movement of the reaction mass 18 and the piston assembly 22.

A conventional hydraulic power source and vibrator electronic control (not shown) operate the hydraulic servo valve 32 to generate a frequency sweep of vibration energy with the hydraulic vibrator 10. The servo valve 32 operates to supply hydraulic fluid under pressure to the first cylinder chamber 24 while draining hydraulic fluid from the second cylinder chamber 26 thereby moving the reaction mass 18 upward with respect to the piston assembly 22. The process is then reversed with the servo valve 32 supplying hydraulic fluid under pressure to the second cylinder chamber 26 while draining hydraulic fluid from the first cylinder chamber 24 to move the reaction mass 18 downward with respect to the piston assembly 22. The displacement of the reaction mass 18 is sensed by a linear variable transducer (LVDT) 34 and supplied to the vibrator electronic control (not shown). The LVDT 34 is fixed to a top member 36 of the housing 12 and extends into the reaction mass 18.

The operation and control of hydraulic vibrators to produce a vibration energy over a frequency range is well known in the art. Further, the configuration of the servo valve 32 and the LVDT 34 are also well known. Therefore, a person of ordinary skill in the art has an understanding of the operation and control of hydraulic vibrators, sufficient to practice the invention of the hydraulic vibrator 10 having the improved central piston assembly 22 which will now be described.

The central piston assembly 22 includes a fixed piston rod 38 which extends through the cylinder bore 20 of the reaction mass 18. The fixed piston rod 38 is affixed to the base plate 14 at one end and is affixed at its other end to the top member 36 which functions as a supporting structure of the housing 12. A piston head 40 is positioned on a middle portion of the fixed piston rod 38 and mates in sealing engagement with a cylinder liner 42 fixed in the cylinder bore 20 of the reaction mass 18.

An adjustable piston rod 44 mates with a shaft 46 of the fixed piston rod 38 and has a piston head 48 positioned at one end. The piston head 48 mates in sealing engagement with the cylinder liner 42 and is positioned adjacent the piston head 40 of the fixed piston rod 38. Thus, the piston head 48 forms a boundary of the first cylinder chamber 24 and the piston head 40 forms a boundary of the second cylinder chamber 26. Movement of the adjustable piston rod 44 along the axis of the fixed piston rod 38 will displace the piston head 48 relative to the piston head 40 and vary the total volume of hydraulic fluid in the first cylinder chamber 24 and the second cylinder chamber 26.

Figure 2:
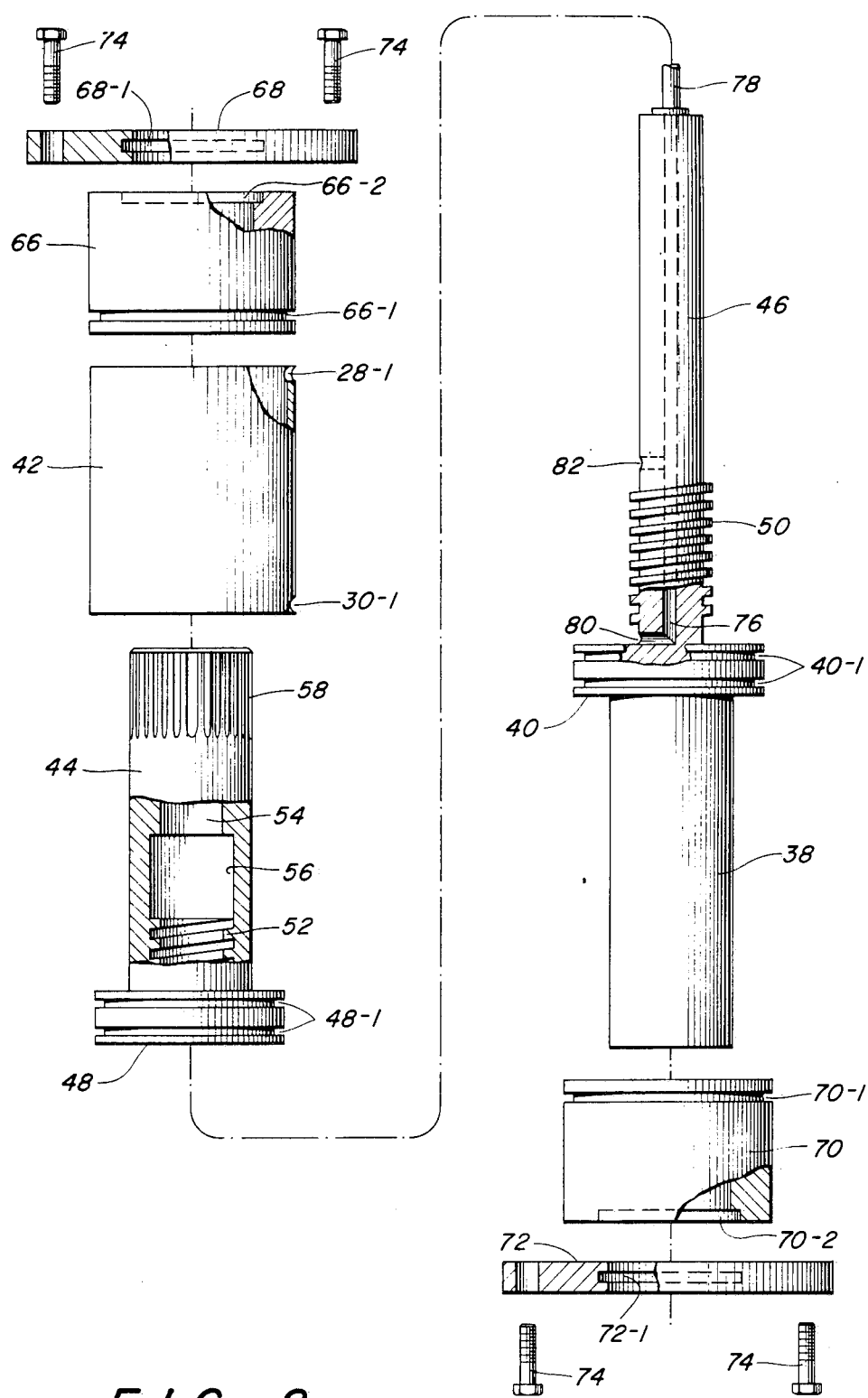

Referring to FIG. 2, an assembly view illustrates the cylinder bore mechanism of the hydraulic vibrator 10. The fixed piston rod 38 has an external thead 50 formed on the shaft 46 which engages an internal thread 52 formed on an axial bore 54 of the adjustable piston rod 44, The axial bore 54 has a recessed section 56 directly adjacent the internal thread 52 for accommodating the portion of the external thread 50 which may extend beyond the internal thread 52 when the adjustable piston rod 44 is moved to the full inward range. The adjustable piston rod 44 has a spline 58 formed at one end, opposite the piston head 48 to serve as a drive engagement for rotating the adjustable piston rod 44.

A drive motor 60, shown in FIG. 1, supplies power to an output gear 62 which engages the spline 58 on the adjustable piston rod 44. The drive motor 60 if affixed to the top member 36 of the housing 10. An encoder 64 is coupled to the drive shaft of the motor 60 and provides a digital signal indicating the angular position of the drive shaft of the drive motor.

During operation of the drive motor 60, the output gear 62 engages the gear spline 58 and rotates the adjustable piston rod 44. As a result, the external threads 52 of the adjustable piston rod 44 engage the internal threads 50 of the fixed piston rod 38 and move the adjustable piston rod 44 along the axis of the fixed piston rod 38. Thus, the rotation of the adjustable rod 44, adjusts the position of piston head 48 with respect to the piston head 40 of the fixed piston rod 38. As a consequence, the volume of the first cylinder chamber 24 is increased or decreased depending on the direction of rotation of the adjustable piston rod 44. The encoder 64 monitors the rotation of the drive motor 60 and produces a signal indicating the vertical position of the adjustable piston rod 38.

The movement of the adjustable piston rod 38 increases or decreases the volume of the first cylinder chamber 24. However, the volume of the second cylinder chamber 26 adjacent the piston head 40 of the fixed piston rod 38 remains the same, assuming that the position of the reaction mass 18 remains the same. During operation of the hydraulic vibrator 10, the swept volume of the cylinder chambers 24 and 26 needs to be the same. The volume of the first and second cylinder chambers 24 and 26 is equalized by moving the reaction mass 18 by one half the distance of the movement of piston head 48 on the adjustable piston rod 44. Thus, recentering the reaction mass in coordination with the movement of the adjustable piston rod 44 serves to equalize the volume change in the first and second cylinder chambers 24 and 26.

The recentering of the reaction mass is performed by the servo valve 32 which passes hydraulic fluid to one cylinder chamber and exhausts an equal amount of hydraulic fluid from the other cylinder chamber. For example, assume that the adjustable piston rod 44 is rotated to displace the piston head 48 downward by one unit which is indicated by the output of the encoder 64. The servo valve 32 operates to pass hydraulic fluid through the second hydraulic chamber 30 to the second cylinder 26 and to exhaust hydraulic fluid from the first cylinder chamber 24 through the first hydraulic chamber 28. As a result, the reaction mass 18 moves downward until the LVDT 34 senses a half unit of movement. At this point, the equalizing operation of the servo valve 32 ceases and the reaction mass 18 is recentered about the piston heads 40 and 48.

A conventional control system for a hydraulic vibrator which is suitable for use with the hydraulic vibrator 10 contains a setpoint for centering the reaction mass with respect to the central piston. The control system contains a servo-position control which operates to initialize the system by operating a servo valve until the LVDT indicates that the reaction mass is in a centered position corresponding to the setpoint. The servo-position control thus moves the reaction mass to a centered position on initial start-up of the hydraulic vibrator in preparation for use of vibrator.

The setpoint of the servo-position control can be varied to move the centered position of the reaction mass 18 in coordination with the movement of the adjustable piston rod 44. Adjustment of the setpoint for the reaction mass can be achieved manually to recenter the reaction mass 18 for a given displacement of the adjustable piston 44. Alternatively, the output of the encoder 64 can be used to automatically adjust the setpoint of the servo-position control in response to the encoded position of the adjustable piston rod 44.

Referring now to FIG. 2, additional features of the cylinder bore mechanism will be described. The cylinder liner 42 contains ports 28-1 and 30-1 which mate with the hydraulic passages 28 and 30, respectively, to allow the flow of hydraulic fluid into the associated cylinder chambers 24 and 26. The piston heads 40 and 48 contain grooves 40-1 and 48-1 respectively for receiving piston rings that seal the piston heads with the cylinder liner 42 when assembled.

An upper rod bushing 66 mates with the adjustable piston rod 44 and is held in position within the cylinder bore 20 in abuttment with the cylinder liner 42 by a cylinder head 68. In a similar fashion, a lower rod bushing 70 engages the fixed piston rod 38 and is held in position by a cylinder head 72. Upon assembly of the cylinder bore mechanism the cylinder head 68 and 72 are retained by head bolts 74 which are threaded into the reaction mass 18.

The rod bushings 66 and 70 contain external grooves 66-1 and 70-1, respectively for receiving sealing rings that seal with the cylinder bore 20 upon assembly. The rod bushings 66 and 70 utilize internal grooves 66-2 and 70-2 for receiving sealing rings which seal, respectively, with the adjustable piston rod 44 and the fixed piston rod 38. The cylinder heads 68 an 72 also contain internal grooves 68-1 and 72-1 for receiving sealing rings which seal, respectively, with the adjustable piston rod 44 and the fixed piston rod 38.

The fixed piston rod 38 has a drain passage 76 which is coupled to a hydraulic drain line 78. The drain passage has a drain port 80 positioned adjacent the piston head 40. Any hydraulic fluid which escapes past the piston rings and collects between the piston heads 40 and 48 can exit through the drain port 80 and drain passage 76 for return to the drain reservoir of hydraulic power source. The removal of the hydraulic fluid in this manner prevents a hydraulic lock from developing between the piston heads 40 and 48. A drain port 82 on the drain passage 76 communicates with the recessed section 56 to drain any hydraulic fluid that escapes through the engaged internal thread 52 and external thread 50 and passes into the recessed section 56.

Referring to FIG. 1, the hydraulic servo valve 32 functions in response to the control system (not shown) to regulate the stroke and frequency of movement of the piston heads 40 and 48 with respect to the reaction mass 18. For low frequency operation, the hydraulic vibrator operates with maximum stroke and the adjustable piston rod 44 is moved fully downward. The adjustable piston is thus rotated and moved downward by the action of the thread 50 and 52 until the piston heads 48 and 40 are closely adjacent. For high-frequency operation, the adjustable piston rod 44 is moved upward to a location where a minimum volume of hydraulic fluid is contained in the cylinder. In order to achieve this result, the distance between the piston heads (40,48) and the rod bearings (66, 70) for a given stroke is maintained at a minimum.

The hydraulic vibrator 10 can be operated in a manual mode or an automatic mode. When operated in the manual mode, the adjustable piston 44 is set by the drive motor 60 at a given position which is appropriate for the frequency sweep and remains fixed for the duration of the frequency sweep. In the automatic mode of operation, the adjustable piston rod 44 is positioned during the frequency sweep to maintain a minimum volume of hydraulic fluid within the cylinder chambers 24 and 26. Thus, as the stroke of the piston heads 40 and 48 change with respect to the reaction mass 18, the adjustable piston rod 44 is rotated to displace the piston heads 40 and 48 to maintain a minimum volume of hydraulic fluid in the cylinder chambers 24 and 26. At the same time, the reaction mass 18 is continuously recentered about the piston heads 40 and 48 in the manner previously described.

The invention has been described with reference to the embodiment shown in the drawings. However, modifications can be made to the invention which alter the illustrated embodiment while remaining within the scope of the invention.

What is claimed is:

1. A hydraulic vibrator for producing vibration energy over a broad band of frequencies and transferring the energy into a structure, comprising:
   a housing having a base plate and a top member;
   a reaction mass having a cylinder bore extending therethrough and positioned within the housing;
   fixed piston rod means having a first piston head with upper shaft and lower rod end and extending through the cylinder bore of the reaction mass with said lower rod end fixed to the base plate and the upper shaft end fixed to said top member;
   an adjustable piston rod means having a second piston head with an upper rod end and having an axial bore for concentric positioning over the upper shaft of the fixed position rod means to dispose the second piston head in the cylinder bore adjacent the first piston head;
   first and second rod bushing members sealing said cylinder bore and defining a cylinder chamber; and
   adjustment means for axially moving the adjustable piston rod means along the shaft portion of the fixed piston rod means to vary the spacing of said first and second piston heads and thereby vary the cylinder volume.

2. The hydraulic vibrator of claim 1 wherein said fixed piston rod means has a piston head on a middle portion thereof and said adjustable piston rod means has a piston head on an end portion thereof positioned adjacent the piston head of the fixed piston rod means.

3. The hydraulic vibrator of claim 2 wherein the shaft portion of said fixed piston rod has a threaded section and the bore of said adjustable piston rod means contains a mating thread in engagement with said threaded section.

4. The hydraulic vibrator of claim 3 wherein said adjustment means includes drive means for rotating said adjustable piston means.

5. The hydraulic vibrator of claim 4 wherein said adjustable piston rod means has a gear spline on the upper rod end in engagement with said drive 6. A hydraulic vibrator for producing vibration energy over a broad band of frequencies and transferring the energy into a structure, comprising:
   a housing having a base plate for engaging the structure receiving the vibration energy;
   a reaction mass disposed within said housing and having a cylinder bore;
   fixed piston rod means having a first piston head, a shaft end and a rod end, said fixed piston rod means rod end being fixed to said base plate with said piston head positioned in said cylinder bore;
   adjustable piston rod means having a second piston head and a rod end with an axial bore, said adjustable piston rod means rod end axial bore being disposed slidingly on said fixed piston rod means shaft end with said second piston head positioned in said cylinder bore;
   first and second rod bushing members sealings said cylinder bore to define a cylinder chamber; and
   adjustment means for axially displacing said adjustable piston rod means relative to said fixed piston rod means to vary the cylinder volume.

7. The hydraulic vibrator of claim 6 wherein said fixed piston rod means has a first piston head on a middle portion thereof and said adjustable piston means has a second piston head on the rod end and positioned adjacent the first piston head of the fixed piston rod means.

8. The hydraulic vibrator of claim 6 wherein said fixed piston rod has a first thread and said adjustable piston rod means contains a second thread for engaging with said first thread.

9. The hydraulic vibrator of claim 8 wherein said adjustment means includes drive means for rotating said adjustable piston means.

10. The hydraulic vibrator of claim 9 wherein said adjustable piston rod means has a gear spline on a second end portion thereof in engagement with said drive means.

* * * * *